United States Patent [19]

Erneta

[11] 4,085,198

[45] Apr. 18, 1978

[54] HYDROCHLORINATION OF SPRAY DRIED MAGNESIUM CHLORIDE

[75] Inventor: Modesto Erneta, Princeton Junction, N.J.

[73] Assignee: N L Industries, Inc., New York, N.Y.

[21] Appl. No.: 641,428

[22] Filed: Dec. 17, 1975

[51] Int. Cl.$^2$ .............................................. C01F 5/34
[52] U.S. Cl. ..................................... 423/498; 34/10
[58] Field of Search .............. 23/304; 423/498; 34/10, 34/22, 30; 159/48 R

[56] References Cited

U.S. PATENT DOCUMENTS

| | | | |
|---|---|---|---|
| 1,479,982 | 1/1924 | Collings | 423/498 |
| 2,417,772 | 3/1947 | Marek | 423/498 |
| 3,336,107 | 8/1967 | Kimberlin | 423/498 |
| 3,346,333 | 10/1967 | Nadler | 423/498 |
| 3,395,977 | 8/1968 | Nadler | 423/498 |

FOREIGN PATENT DOCUMENTS 593,421   3/1960   Canada ............................ 423/498

Primary Examiner—Hiram H. Bernstein

[57] ABSTRACT

Hydrous magnesium chloride in the form of spray dried particulate material of relatively high density is pre-dried, initially using a dry gas at elevated temperature and for a period of time sufficient to partially hydrolyze the magnesium chloride and reduce the chemically combined water to at least as low as about 3.0%, and thereafter hydrochlorinated to reduce the oxides of Mg to at least as low as about 0.6% as MgO.

1 Claim, 2 Drawing Figures

HYDROCHLORINATION OF SPRAY DRIED MAGNESIUM CHLORIDE

BACKGROUND OF INVENTION

Magnesium metal has, over the years, been produced by any one of several different methods, as for example an electrolytic extraction process developed in Germany by Aluminum and Magnesium Fabrik; the Elektron process, based on conversion of magnesium oxide with carbon and chlorine; the Murex process using calcium carbide as a reducing agent according to equation:

$$MgO + CaC_2 = Mg + CaO + 2C;$$

and the Ferrosilicon reduction process of Farben Industrie using calcined dolomite in accordance with the equation:

$$2(MgO + CaO) + Si = (CaO)_2 SiO_2 + 2Mg$$

For various reasons the thermo-processes have never proved successful on a commercial scale. On the other hand, electrolytic extraction processes are in use commercially wherein the source materials are naturally occurring brines, such as sea water and lake brines which are processed to produce hydrous magnesium chloride. However, before the hydrous magnesium chloride can be used as electrolyte for the electrolytic production of magnesium metal it must be converted to substantially anhydrous magnesium chloride by dehydration which, in the interest of low operating costs must be efficient and relatively inexpensive. Moreover, dehydration of the hydrous magnesium chloride must be carried out in a manner such that the anhydrous magnesium chloride produced will be substantially free of major contaminants such as the oxides of magnesium i.e. MgOHCl or MgO. Of the various methods used for dehydrating hydrous magnesium chloride, spray drying has been most effective in producing an anhydrous $MgCl_2$ with relatively low amounts of the oxides of magnesium. However, efforts to further dehydrate the spray dried product by fluidizing with dry HCl gas, hereinafter referred to as hydrochlorination, have been generally unsuccessful due to the nature of the spray dried dihydrate which is generally so finely divided and of such a light, fluffy nature that fluidization must be carried out at very low gas velocities and with excessively large equipment. The hydrochlorination of spray dried, partially dehydrated magnesium chloride is thereby made relatively complex and expensive.

Attempts to overcome the difficulties encountered with spray dried, partially dehydrated magnesium chloride are illustrated by U.S. Pat. No. 3,742,100, June 26, 1973 and U.S. Pat. No. 3,760,050, Sept. 18, 1973, wherein molten magnesium chloride hydrate is formed into relatively large granules by prilling the melt from a centrifuge or perforated plate. The prills are relatively large and heavy compared to a spray dried product and hence are more amenable to fluidization. Nevertheless, the cost of prilling the hydrous magnesium chloride is relatively high and hence a distinct disadvantage where operational costs must be kept to a minimum in order to be competitive. Further, U.S. Pat. No. 3,346,333, describes atomizing a concentrated magnesium chloride brine comprising 4.2 to 4.4 moles water/mole of magnesium chloride in a fluidized bed using hydrogen chloride as a fluidizing gas. However, the large quantity of water that must be removed in the fluidized bed requires large amounts of heat which necessitates the use of an expensive heat transfer medium as well as specially built and relatively expensive equipment.

In view of the rising demands for magnesium it is desirable, therefore, to provide a process for producing anhydrous magnesium chloride from naturally occurring brines which process will be adapted not only to commercial production schedules but will be relatively simple and economical to operate, will avoid many of the difficulties encountered in the methods of the prior art and will produce substantially anhydrous magnesium chloride that is to say a magnesium chloride particulate material comprising no more than about 1.0% water and no more than about 0.6% magnesium oxide.

SUMMARY OF INVENTION

The present invention is the discovery of an improved process for producing anhydrous magnesium chloride substantially free of impurities including MgO, using as a source material spray dried hydrous magnesium chloride, the process being characterized by treating the magnesium chloride brine prior to spray drying in a manner such that the spray dried material, i.e. chamber product, will be relatively dense, that is to say, will have a density in the range of from 11 to 18 lbs./cubic foot. Spray drying is then followed by predrying the relatively dense spray dried material using a dry gas, such as air or a combustion gas, at elevated temperatures and for a period of time such that the magnesium chloride is partially hydrolyzed i.e. to form oxides of magnesium, and the chemically absorbed water reduced at least to as low as about 3.0%; and thereafter the now partially dried, partially hydrolyzed magnesium chloride is hydrochlorinated by fluidizing with dry, hot, hydrogen chloride gas in the absence of external heating, to produce substantially anhydrous magnesium chloride having as little as 0.2% oxides as MgO.

It is to be noted that dehydration of hydrous magnesium chloride, as practiced in the prior art, has been carried out specifically in a manner to prevent hydrolysis of the magnesium chloride and the formation of magnesium oxide. In contradistinction, the instant invention is the unexpected discovery that a new and important advantage is achieved by controlling the initial drying stage such that the magnesium chloride is indeed partially hydrolyzed, that is to say, a significant amount of MgO and/or MgOHCl is formed — while making a substantial reduction in the amount of chemically combined water; and that removal of the remaining relatively small amount of water in the partially hydrolyzed $MgCl_2$ can be effected in a subsequent hydrochlorination stage using dry, hot, hydrogen chloride gas wherein the heat of neutralization generated by the exothermal reaction of the partially dried, partially hydrolyzed magnesium chloride and HCl, plus a relatively small amount of heat contributed by the preheated HCl will suffice to remove the remaining water from the magnesium chloride without additional external heating and to reduce the oxide to at least as low as about 0.6% as MgO. The phrase "partially hydrolyzed" as used herein will be understood to mean oxidation of magnesium values to as high as about 10.0% as MgO as hereinafter described.

PREFERRED EMBODIMENT OF INVENTION

Figure 2:
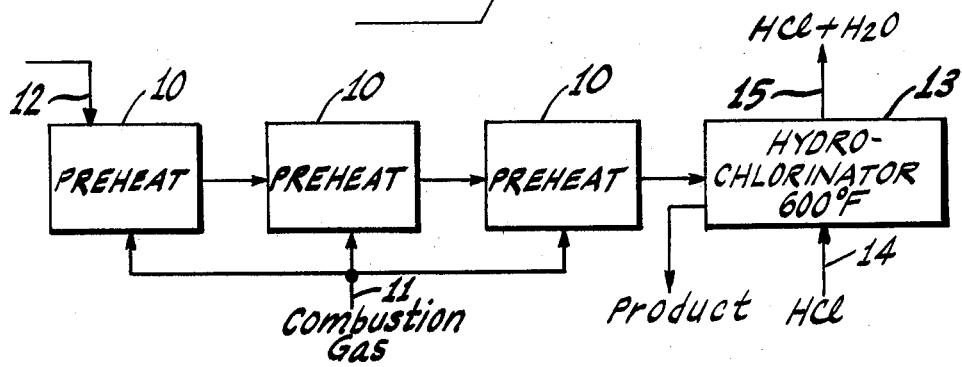
FIG. 2 is a schematic flow diagram of one embodiment of the hydrochlorination process of this invention for producing anhydrous magnesium chloride from spray dried hydrous magnesium chloride.

A preferred embodiment of the novel hydrochlorination process of this invention is illustrated schematically in FIG. 2 of the drawing; and is based on the newly discovered kinetic relationship between MgO and the chemically combined water in hydrous magnesium chloride during drying. As mentioned above, earlier drying techniques were designed specifically to avoid hydrolysis of the magnesium chloride during drying and as a result relatively large amounts of heat were required, in subsequent drying stages, to remove the relatively large amounts of residual water.

Figure 1:
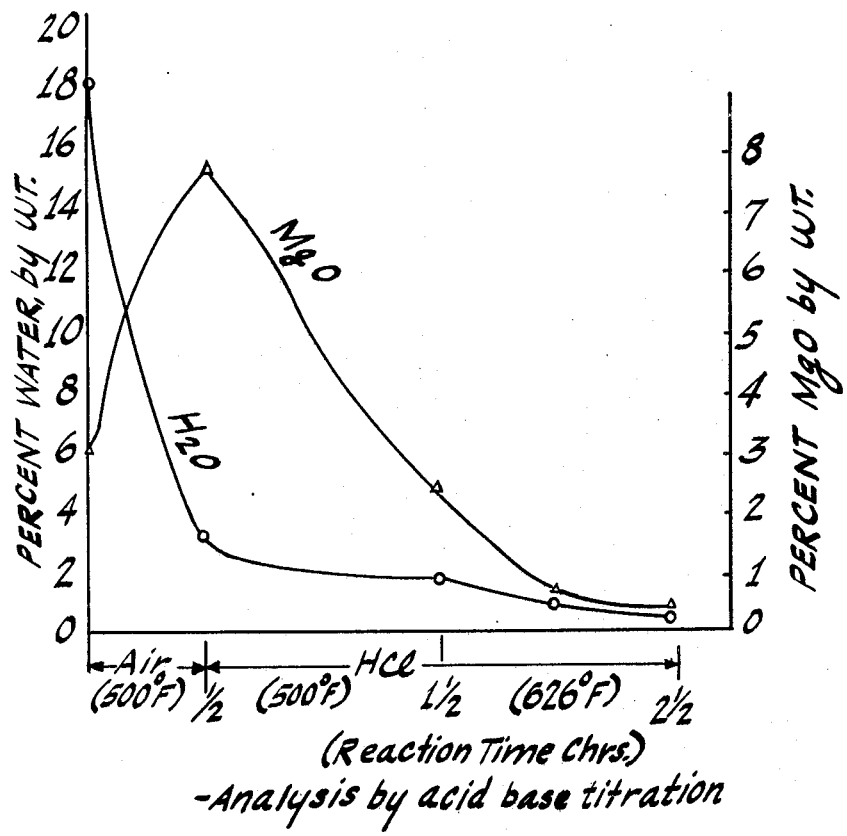
FIG. 1 is a graph of the kinetics of magnesium oxide formation and water removal by air-drying dried magnesium chloride brine.

As shown in FIG. 1 it has now been found that when drying hydrous magnesium chloride using substantially dry air at temperature of about 500° C. and at gas flow rates of about 1200 cubic centimeters per minute, the weight percent chemically combined water drops rapidly from about 18% to as low as about 3.28% in about 30 minutes and thereafter at a somewhat slower rate to as low as about 1% water after about 2 hours; that hydrolysis of the magnesium chloride increases relatively rapidly for the first 30 minutes to as high as 7.73%; and that when the predried product is fluidized by hot HCl gas the heat of neutralization plus the heat contributed by the hot HCl will suffice to reduce the oxides of magnesium in the predried products to as low as 0.6% as MgO in about 2 hours.

Utilizing this discovery the hydrochlorination process of this invention was developed which, as shown in FIG. 2, comprises drying the spray dried magnesium chloride material, preferably in three successive stages, first with a dry, heated gas, such as air or a combustion gas, such as $CO_2$, $CO$, and $O_2$ to provide a partially hydrolyzed magnesium chloride; and thereafter hydrochlorinating the partially dried, partially hydrolyzed product with hot, dry, hydrogen chloride gas in one or more stages.

Concerning the spray dried magnesium chloride used in carrying out the hydrochlorination process of this invention; this is a finely divided but relatively dense spray dried material produced by any one of several methods one of which comprises adding a gelling agent to the magnesium chloride brine concentrate to convert the brine into a gel prior to spray drying, as described more fully in co-pending application Ser. No. 560,337 filed Mar. 21, 1975, (now U.S. Pat. No. 3,975,283 granted Aug. 17, 1976) said application and the instant application having a common assignee; and co-pending application Ser. No. 593,679 filed July 7, 1975, (now U.S. Pat. No. 3,989,472 granted Nov. 2, 1976) which application discloses another method for forming a relatively dense spray dried hydrous magnesium chloride wherein the magnesium chloride brine concentrate is treated with a surface modifying agent prior to spray drying with the result that the spray dried magnesium chloride material is relatively dense — said application and the instant application having a common assignee.

The spray dried products made according to these methods will comprise essentially magnesium chloride plus from 3 to 5% MgO and from 12 to 18% $H_2O$; and will be a finely divided particulate material having a chamber bulk density in the range of from 11 to 18 lbs./cubic foot. As such the spray dried material can be fluidized using hot, dry gases at relatively high velocities without experiencing excessive losses through dusting; and in addition can be readily handled that is to say conveyed, stored, fed to subsequent processing operations and so forth.

Referring again to FIG. 2, the initial drying stage is preferably characterized by three successive fluidized-bed type preheaters indicated generally at 10, each preheater connected in series and fed with hot, dry air or a combustion gas from a common source 11. The spray dried hydrous magnesium chloride is fed into the top of the first of the three preheaters as at 12 and the drying gas into the bottom of each preheater, respectively, whereby the spray dried magnesium chloride in the first preheater is fluidized by counter-current flow of the hot gases. In this connection the hot gases are introduced at temperatures of at least about 500° to as high as 800° F. and at flow rates in the range of from 0.10 to 0.60 feet per second. Following retention in the first preheater for a period of time determined by the composition of the feed material, gas temperature and flow rates, the partially dried magnesium chloride is fed from the first preheater into the second fluidized bed preheater in which it is again fluidized by the counter-current flow of the drying gas under substantially the same operating conditions as provided in the first preheater. The partially dried magnesium chloride from the second preheater is then fed into the third preheater wherein the magnesium chloride is again subjected to fluidization by direct contact with the aforesaid hot, dry gases.

Using gas temperatures and flow rates within the ranges specified and over a time span ranging from 150 to 500 minutes, the hot, partially dried, partially hydrolyzed product recovered from the third fluidized bed preheater will be at a temperature in the range from 500° to 800° F. and will analyze from 1.5 to 3.3% water and from 7.7 to 10% MgO.

The partially dried, partially hydrolyzed magnesium chloride from the third stage preheater is then subjected to hydrochlorination in one or more stages wherein the hot, partially dried magnesium chloride is fluidized by a counter-current flow of dry, preheated hydrogen chloride gas which is fed into the bottom of a fluidized bed hydrochlorinator 13 via feed pipe 14 at the rate of from 0.10 to 0.60 feet per second and at a temperature preferably from 550 to 700° F. Despite the relatively small amount of heat added by the hot HCl gas the heat of neutralization developed by the exothermal reaction of the preheated, hydrolyzed $MgCl_2$ and the HCl will suffice to provide the total amount of heat necessary, thermodynamically, to substantially completely dehydrate the hydrolyzed $MgCl_2$. During hydrochlorination a mixture of water, as steam, in an amount of from 3 to 7% and gaseous HCl (95%) is discharged from the top of the hydrochlorinator, via the exhaust pipe 14, the HCl being recoverable by known processes such as described in U.S. Pat. No. 3,779,870, Dec. 18, 1973. It is noteworthy that because of the relatively low amount of water in the partially dried $MgCl_2$ from the third stage preheater, the $HCl-H_2O$ discharge from the hydrochlorinator is reduced thus making for simplified recovery of the HCl.

Hydrochlorination of the partially dried, partially hydrolyzed magnesium chloride is thus effected without the use of external heat — substantially all of the heat required to dehydrate the magnesium chloride being derived from the sensible heat of the hot magnesium chloride feed material from the third stage preheater, and the heat of neutralization of the chemical reaction between the preheated $MgCl_2$ feed material and the hot HCl. In this sense then, hydrochlorination of the partially dried magnesium chloride is accomplished without external heating and hence effects a significant saving in the overall cost of producing a substantially anhydrous magnesium chloride. Moreover, in addition to a significant saving in heating cost, hydrochlorination of the preheated relatively dry magnesium chloride in successive stages has been found to increase chlorination efficiencies such that the residual magnesium oxide in the dehydrated magnesium chloride will be at least as low as about 0.6%.

The anhydrous magnesium chloride produced by the process of this invention is thus sufficiently low in water and oxides to be used as a fused electrolyte in electrolytic production of magnesium metal.

While the hydrochlorination process of this invention is carried out preferably according to the schematic flow diagram of FIG. 2 modifications are contemplated within the scope of the invention, one such modification being the introduction of a small amount of gaseous hydrogen chloride along with the combustion gas and/or air in the preheating stages of the spray dried magnesium chloride. Using this innovation the product discharged from the third preheater stage will analyze no more than about 1% water and as low as about 0.2% magnesium oxide as analyzed by acid neutralization. As a consequence, the residence time required in the hydrochlorination stage is significantly lowered thus reducing costs and increasing throughput.

The invention is illustrated further by the following example in which preheating and hydrochlorination are each carried out in a single stage.

23 grams spray dried magnesium chloride in brine concentrate analyzing about 18% water, 3% MgO, the remainder magnesium chloride, and having a bulk density of about 11 lbs./cubic foot was fed into a preheater comprising a tubular 35 mm fluid-bed type reactor. A gas-inlet was provided in the bottom of the reactor and mounted within the reactor immediately above the air-inlet was a porous plate. An off-gas outlet was provided in the upper end of the reactor and the entire assembly was mounted in an electrically heated furnace. Dry air at about 500° F. was introduced into the bottom of the preheater at the rate of about 1200 cc/min. at which rate the relatively dense spray dried magnesium chloride was fluidized in the reactor but without an appreciable losses due to dusting. As shown in FIG. 1 at the end of about 30 minutes the $MgCl_2$ water was reduced to 3.28% and the MgO increased to about 7.73% by weight. Fluidization of the $MgCl_2$ was then continued at the same temperature but with dry HCl gas. At the end of 60 minutes the $MgCl_2$ water was reduced to about 1.78% and the MgO decreased to about 2.49%. The temperature of the HCl gas was then increased to about 626° F. and held steady for about 60 minutes at the end of which time the $MgCl_2$ water was reduced to 0.95% and the MgO to 0.61% by weight.

While the invention has been described and illustrated by the example included herein it is not intended that the invention be strictly limited thereto and other variations and modifications may be employed within the scope of the appended claims.

I claim:

1. Process for treating spray dried magnesium chloride solids having a bulk density in the range of from about 11 to about 18 pounds per cubic foot and containing about 12 to 18 weight percent water and from about 3 to 5 weight percent magnesium oxide comprising, heating said solids in the presence of a dry gas selected from the group consisting of air and combustion gases in the range from about 500° to 800° F for a period of about one half hour, subsequently hydrochlorinating such heated solids with preheated dry hydrogen chloride gas heated to a temperature in the range of from about 550° to 700° F, thereby to produce a substantially anhydrous magnesium chloride feed material having a magnesium oxide content of no more than about 0.6 weight percent.

* * * * *